United States Patent
Rapp et al.

(10) Patent No.: US 9,812,010 B1
(45) Date of Patent: *Nov. 7, 2017

(54) METHOD, SYSTEM AND COMPUTER PROGRAM PRODUCT FOR LAW ENFORCEMENT

(71) Applicant: COPsync, Inc., Dallas, TX (US)

(72) Inventors: Jason Shane Rapp, Canyon Lake, TX (US); Russell Dean Chaney, Canyon Lake, TX (US)

(73) Assignee: COPsync, Inc., Dallas, TX (US)

( * ) Notice: Subject to any disclaimer, the term of this patent is extended or adjusted under 35 U.S.C. 154(b) by 32 days.

This patent is subject to a terminal disclaimer.

(21) Appl. No.: 14/726,274

(22) Filed: May 29, 2015

Related U.S. Application Data (63) Continuation of application No. 13/304,659, filed on Nov. 27, 2011, now Pat. No. 9,047,768.

(60) Provisional application No. 61/421,195, filed on Dec. 8, 2010.

(51) Int. Cl.
  *G08B 21/00* (2006.01)
  *G08G 1/0965* (2006.01)
  *H04W 4/04* (2009.01)

(52) U.S. Cl.
  CPC .......... *G08G 1/0965* (2013.01); *H04W 4/046* (2013.01)

(58) Field of Classification Search
  CPC ........ G08G 1/017; G08G 1/202; G08G 1/205; G08G 1/0965; H04W 4/046
  USPC .......................................................... 340/902
  See application file for complete search history.

(56) References Cited

U.S. PATENT DOCUMENTS

| | | |
|---|---|---|
| 6,359,570 B1 | 3/2002 | Adcox et al. |
| 7,646,286 B2 | 1/2010 | Harumoto et al. |
| 2005/0073436 A1 | 4/2005 | Negreiro |
| 2005/0203892 A1 | 9/2005 | Wesley et al. |
| 2010/0090827 A1 | 4/2010 | Gehrke et al. |
| 2010/0274816 A1 | 10/2010 | Guzik |

*Primary Examiner* — Mark Rushing
(74) *Attorney, Agent, or Firm* — Fish & Richardson P.C.

(57) ABSTRACT

From a first patrol unit, the first data are received for identifying a location of the first patrol unit. From the first patrol unit, second data are received for identifying a subject. The subject includes at least one of: a subject vehicle; and a subject person. A database is queried about the subject and, in response to the querying, a determination is made bout whether the subject is a likely threat. In response to determining that the subject is a likely threat, and in response to the first data, a predetermined number of second patrol units are identified that are most geographically proximate to the location of the first patrol unit, and a message is output to the predetermined number of second patrol units about: the subject; the likely threat; and the first patrol unit.

19 Claims, 9 Drawing Sheets

METHOD, SYSTEM AND COMPUTER PROGRAM PRODUCT FOR LAW ENFORCEMENT

CROSS-REFERENCE TO RELATED APPLICATIONS

This application is a continuation of U.S. application Ser. No. 13/304,659, filed Nov. 27, 2011, which claims priority to U.S. Provisional Application No. 61/421,195, filed Dec. 8, 2010. The disclosures of the prior applications are considered part of and are incorporated by reference in the disclosure of this application.

BACKGROUND

The disclosures herein relate in general to information handling systems, and in particular to a method, system and computer program product for law enforcement.

SUMMARY

In a first aspect, from a first patrol unit, first data are received for identifying a location of the first patrol unit. From the first patrol unit, second data are received for identifying a subject. The subject includes at least one of: a subject vehicle; and a subject person. A database is queried about the subject and, in response to the querying, a determination is made about whether the subject is a likely threat. In response to determining that the subject is a likely threat, and in response to the first data, a predetermined number of second patrol units are identified that are most geographically proximate to the location of the first patrol unit, and a message is output to the predetermined number of second patrol units about: the subject; the likely threat; and the first patrol unit.

In a second aspect, in response to the first and second data, a predetermined number of second patrol units are identified that are most geographically proximate to the location of the first patrol unit, and a message is output to the predetermined number of second patrol units about the subject.

In a third aspect, in response to the second data, second patrol units are identified that belong to a specified one or more categories of patrol units, and a message is output to the second patrol units about the subject.

In a fourth aspect, from a first patrol unit, information is received for identifying a geographic area. From the first patrol unit, a communication is received. In response to the information and the communication, second patrol units are identified within the geographic area, and the communication is output to the second patrol units.

In a fifth aspect, from a patrol unit that is associated with a human officer, a record is received of the human officer contacting a subject. The subject includes at least one of: a subject object; a subject person; and a subject location. In response to the receiving, the record is stored in a database, irrespective of whether the record has been adjudicated.

In a sixth aspect, from a patrol unit that is associated with a human officer, data are received for identifying a location of the patrol unit. From the patrol unit, a record is received of the human officer pursuing a subject. The subject includes at least one of: a subject vehicle; and a subject person. In response to the receiving, the data and the record are stored in association with one another in a database.

DESCRIPTION OF DRAWINGS

Like reference numbers and designations in the various drawings indicate like elements.

DETAILED DESCRIPTION

Figure 1:
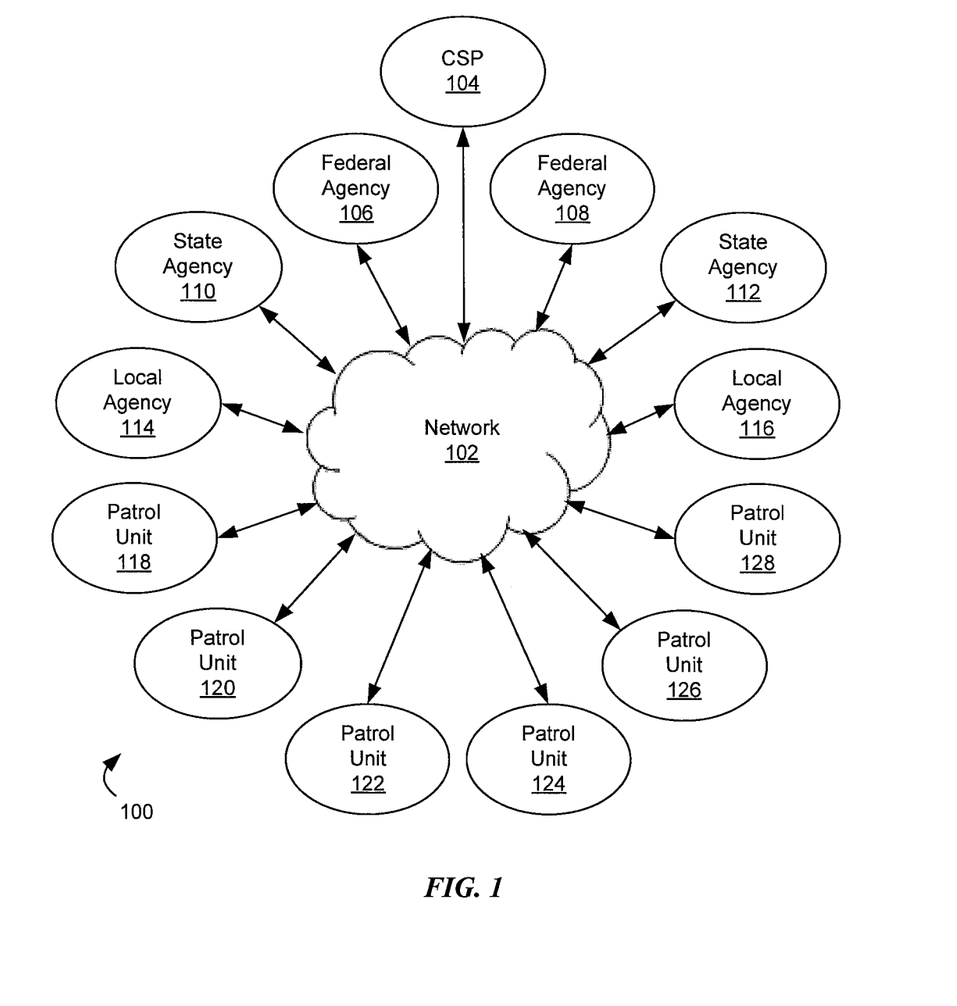
FIG. 1 is a block diagram of an information handling system of the illustrative embodiment.

FIG. 1 is a block diagram of a system, indicated generally at 100, according to the illustrative embodiment. The system 100 includes: (a) a network 102, such as a Transport Control Protocol/Internet Protocol ("TCP/IP") network (e.g., the Internet or an intranet); (b) a crime-fighting services platform 104 ("CSP") for executing a CSP process; (c) federal agencies 106 and 108, each for executing respective federal agency processes; (d) state agencies 110 and 112, each for executing respective state agency processes; (e) local agencies 114 and 116, each for executing respective local agency processes; and (f) mobile patrol units 118, 120, 122, 124, 126 and 128 (e.g., located in respective patrol cars), each for executing respective patrol unit processes.

In one embodiment: (a) the agencies 106, 108, 110, 112, 114 and 116 are law enforcement agencies; and (b) the CSP aggregates, manages and communicates various information from and to the agencies and patrol units in support of their law enforcement activities. Accordingly, as shown in FIG. 1, the CSP is coupled through the network 102 to each of the agencies and patrol units. Through the network 102, information is electronically (e.g., wirelessly) communicated by the CSP, agencies and patrol units, to and from one another. For example, through the network 102, human users (from among the CSP, agencies and patrol units) may elect to communicate such information to and from one another orally (e.g., voice-over-IP communications).

For clarity, FIG. 1 shows one representative CSP, but more such CSPs are likewise connectable to the network 102. Also, FIG. 1 shows six representative agencies, but more such agencies are likewise connectable to the network 102 for operation with the CSP. Further, FIG. 1 shows six representative patrol units, but more such patrol units are likewise connectable (e.g., via wireless telecommunication) to the network 102 for operation with the CSP.

The CSP is helpful for accurately and efficiently aggregating, managing and communicating various information from and to the agencies and patrol units in support of their law enforcement activities, especially in view of: (a) the potentially large number of such agencies and patrol units; (b) their even larger number of various activities, and potential difficulty in timely obtaining and sharing relevant information about such activities, which are potentially complex; (c) a wide range of different circumstances and preferences of such agencies and patrol units; and (d)

potentially frequent changes in such agencies, patrol units, activities, circumstances and preferences.

Figure 2:
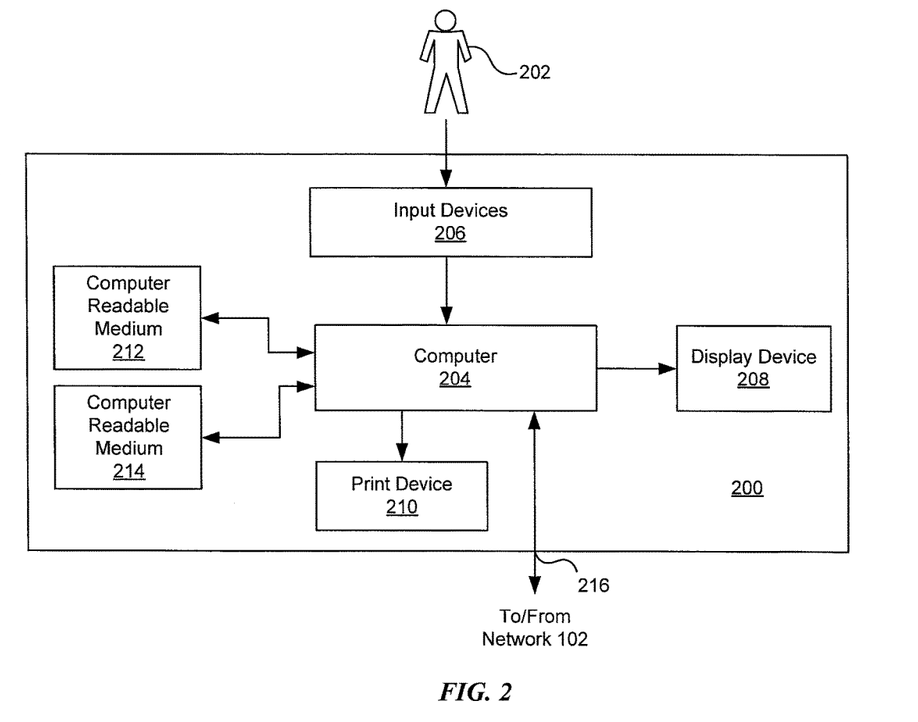
FIG. 2 is a block diagram of a representative computing system of the information handling system of FIG. 1.

FIG. 2 is a block diagram of a representative computing system 200 of the illustrative embodiment. Each of the CSP, agencies and patrol units includes a respective computing system, such as the representative computing system 200, for executing a respective process and performing respective operations (e.g., processing and communicating information) in response thereto. Such computing system operates in association with a respective human user 202.

The system 200 is formed by various electronic circuitry components, including: (a) a general purpose computer 204, which is a general purpose computational resource such as a laptop computer, for executing and otherwise processing instructions, and for performing additional operations (e.g., communicating information) in response thereto; (b) input devices 206 for receiving information from the user 202; (c) a display device 208 (e.g., a conventional flat panel monitor) for displaying information to the user 202; (d) a print device 210 (e.g., a conventional electronic printer) for printing visual images on paper; (e) a computer readable medium (or apparatus) 212 (e.g., a hard disk drive or other nonvolatile storage device) for storing information; (f) a portable computer readable medium (or apparatus) 214 (e.g., a removable flash memory card or CD-ROM) for storing information; and (g) various other electronic circuitry for performing other operations of the system 200.

For example, the computer 204 includes: (a) a network interface (e.g., circuitry) for communicating information with the network 102 (e.g., outputting information to, and receiving information from, the network 102), such as by transferring information (e.g. instructions, data, signals) between the computer 204 and the network 102; and (b) a memory device (e.g., random access memory ("RAM") device and/or read only memory ("ROM") device) for storing information (e.g., instructions of software executed by the computer 204, and data processed by the computer 204 in response to such instructions). Accordingly, the network interface of the computer 204 is coupled through a network connection 216 to the network 102. Also, in the example of FIG. 2, the computer 204 is connected to the input devices 206, the display device 208, the print device 210, the computer readable medium 212, and the computer readable medium 214, as shown in FIG. 2. The computer 204 executes: (a) operating system software for performing general purpose tasks; and (b) other processes and applications.

In response to signals from the computer 204, the display device 208 displays visual images, which represent information, and the user 202 views such visual images. Also, the user 202 operates the input devices 206 for outputting information to the computer 204, and the computer 204 receives such information from the input devices 206. Moreover, in response to signals from the computer 204, the print device 210 prints visual images on paper, and the user 202 views such visual images.

The input devices 206 include, for example, a conventional electronic keyboard (or keypad) and a pointing device, such as a conventional electronic "mouse" or rollerball. The user 202 operates the keyboard (or keypad) to output alphanumeric text information to the computer 204, which receives such alphanumeric text information. The user 202 operates the pointing device to output cursor-control information to the computer 204, and the computer 204 receives such cursor-control information. The input devices 206 also include, for example, touch-sensitive circuitry of a liquid crystal display ("LCD") device.

Figure 3:
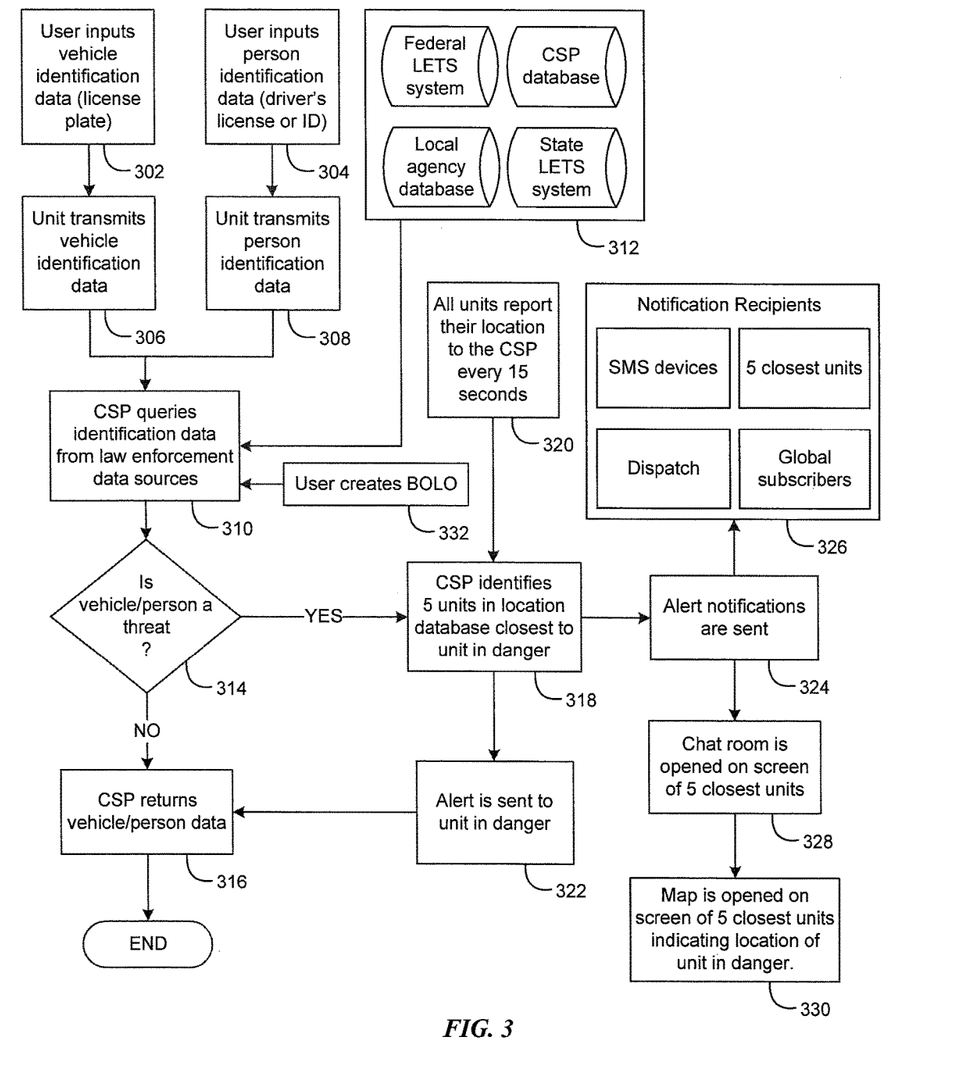
FIG. 3 is a flowchart of a first operation of the information handling system of FIG. 1.

FIG. 3 is a flowchart of a first operation of the system 100. From an officer (which is associated with a patrol unit) via the patrol unit's associated input devices (e.g., from a human officer, such as a police officer, a sheriff or a security person), the patrol unit receives information for identifying a subject ("subject identification data"), such as: vehicle identification data (step 302) for identifying a subject vehicle; and person identification data (step 304) for identifying a subject person. In response to the patrol unit's receipt of the subject identification data, the patrol unit automatically outputs such data to the CSP (steps 306 and 308) through the network 102. At a step 310, in response to such data, the CSP automatically: (a) receives and stores such data in association with such patrol unit's reported then-current geographic location; and (b) through the network 102 (e.g., via extensible markup language ("XML") transmission), queries multiple law enforcement sources 312 about the subject, and receives (from the sources 312) information about the subject in response thereto. The sources 312 include: (a) local agency databases; (b) the CSP's database; (c) state law enforcement telecommunications system ("LETS") databases; and (d) federal LETS databases.

At a step 314, in response to the information (received by the CSP from the sources 312) about the subject (e.g., about such vehicle and/or person), the CSP executes a software application for: (a) analyzing such information; and (b) in response to such analysis, determining whether the subject is a likely threat (e.g., a probable danger to the patrol unit, its associated patrol car, and/or its associated officer). If the CSP determines (at the step 314) that the subject is an unlikely threat, then the CSP outputs (through the network 102) a message to inform the patrol unit accordingly (step 316). Such message includes information (received by the CSP from the sources 312) about the subject.

Conversely, if the CSP determines (at the step 314) that the subject is a likely threat, then the CSP executes a software application for identifying a predetermined number (e.g., 5) of other patrol units that are most geographically proximate to the patrol unit in probable danger (step 318). As shown at a step 320, through the network 102, the patrol units report their respective then-current geographic locations to the CSP at a periodic rate (e.g., once every 15 seconds), so that such reports are periodically updated. The CSP automatically receives such reports through the network 102, and the CSP accordingly updates its record of such locations in a database of auto vehicle location ("AVL") information (e.g., stored in the computer readable medium 212 of the CSP), so that the CSP: (a) stores a timeline record of each patrol unit's various geographic locations; and (b) is thereby enabled to identify a predetermined number of other patrol units that are most geographically proximate to the patrol unit in probable danger.

After the step 318, the CSP outputs (through the network 102): (a) an alert to the patrol unit in probable danger (step 322), plus a message (to such patrol unit) that includes information (received by the CSP from the sources 312) about the subject and the likely threat (step 316); and (b) alert notifications (step 324) to other recipients 326 about the subject and the likely threat. The other recipients 326 include: (a) various global subscribers; (b) various dispatch units; (c) various short message service ("SMS") devices; and (d) additionally, only those identified predetermined number of other patrol units that are most geographically proximate to the patrol unit in probable danger. Accordingly, the CSP outputs the alert notifications to the other recipients 326 by one or more of the following techniques: (a) instant text messaging; (b) broadcast messaging; and (c) "officer needs assistance" messages.

Figure 6:
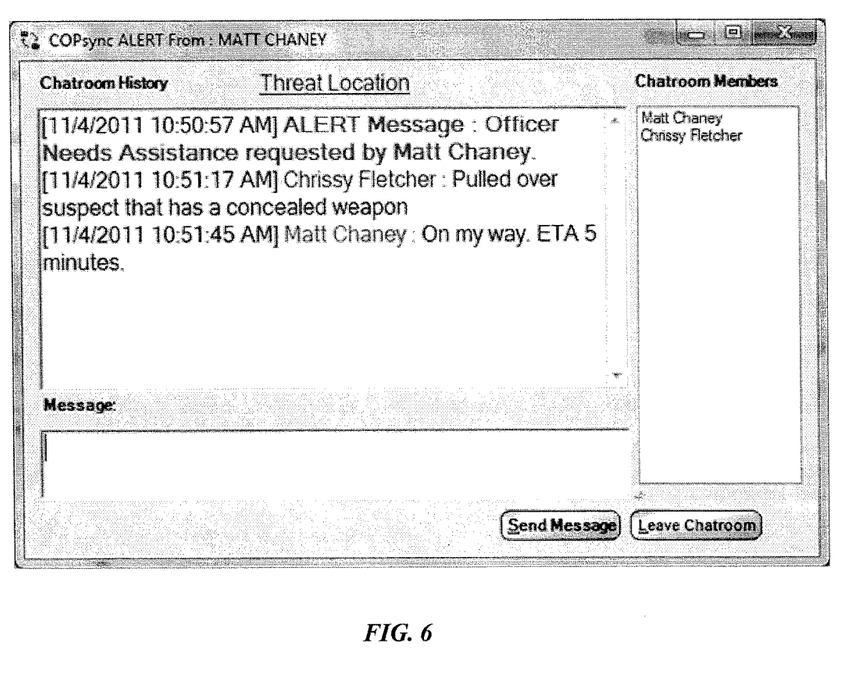
FIG. 6 is an illustration of a first screen displayed by a display device of the information handling system of FIG. 1.
Figure 7:
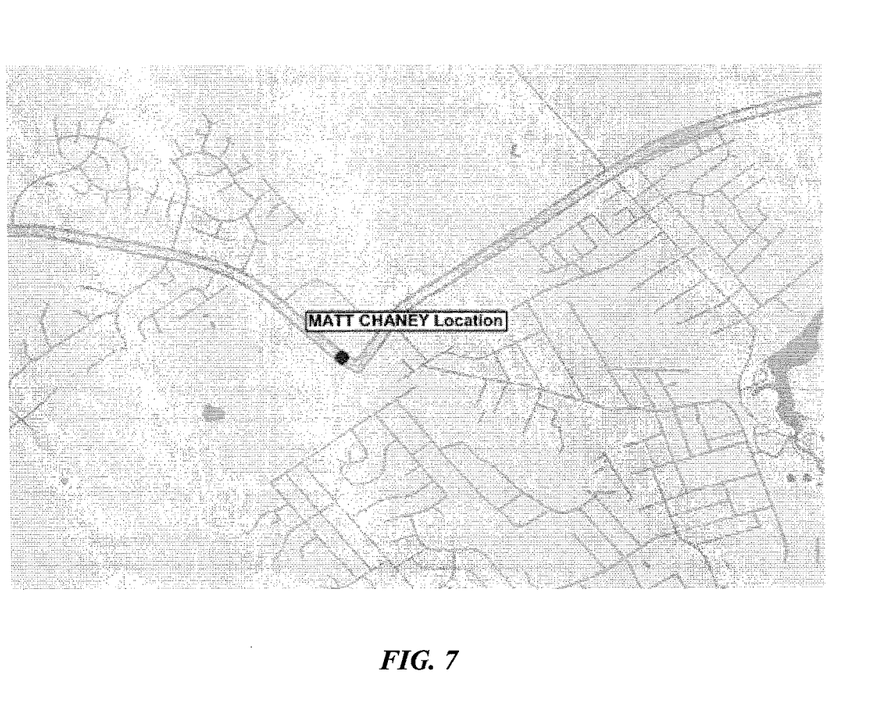
FIG. 7 is an illustration of a second screen displayed by a display device of the information handling system of FIG. 1.

In response to those other patrol units' receipt of the alert notifications from the CSP, they output (through their respectively associated display devices) suitable information to their respectively associated officers, who may respond accordingly (e.g., by assisting the officer of the patrol unit in probable danger). For example, such information includes display of: (a) a chat room screen (e.g., as shown in FIG. 6) for such officers to communicate (by alphanumeric text messages) with one another about the probable danger and possible responses (step 328); and (b) a map screen (e.g., as shown in FIG. 7) for showing the then-current geographic location of the patrol unit in probable danger, on a periodically updated basis (step 330).

At a step 332, in response to the patrol unit's receipt of a "be on the lookout" command ("BOLO") from an officer via the patrol unit's associated input devices, the patrol unit automatically outputs a BOLO message to the CSP through the network 102. At the step 310, in response to the BOLO message (which includes relevant subject identification data, such as vehicle identification data and/or person identification data), the CSP automatically: (a) receives and stores such data in association with such patrol unit's reported then-current geographic location; and (b) through the network 102, queries the sources 312 about the subject, and receives (from the sources 312) information about the subject in response thereto. After the step 310, the operation continues as discussed hereinabove in connection with the steps 314 through 330. In one example, in response to the BOLO message: (a) at the step 318, the CSP executes a software application for identifying all other patrol units that belong to a specified one or more categories of patrol units (e.g., all other patrol units that belong to a specified one or more task forces, sectors, agencies, counties, states and/or other governments); and (b) at the step 324, the CSP outputs (through the network 102) alert notifications to those other patrol units, in addition to the other recipients 326. In one embodiment, the one or more categories are specified in the BOLO message itself.

Figure 4:
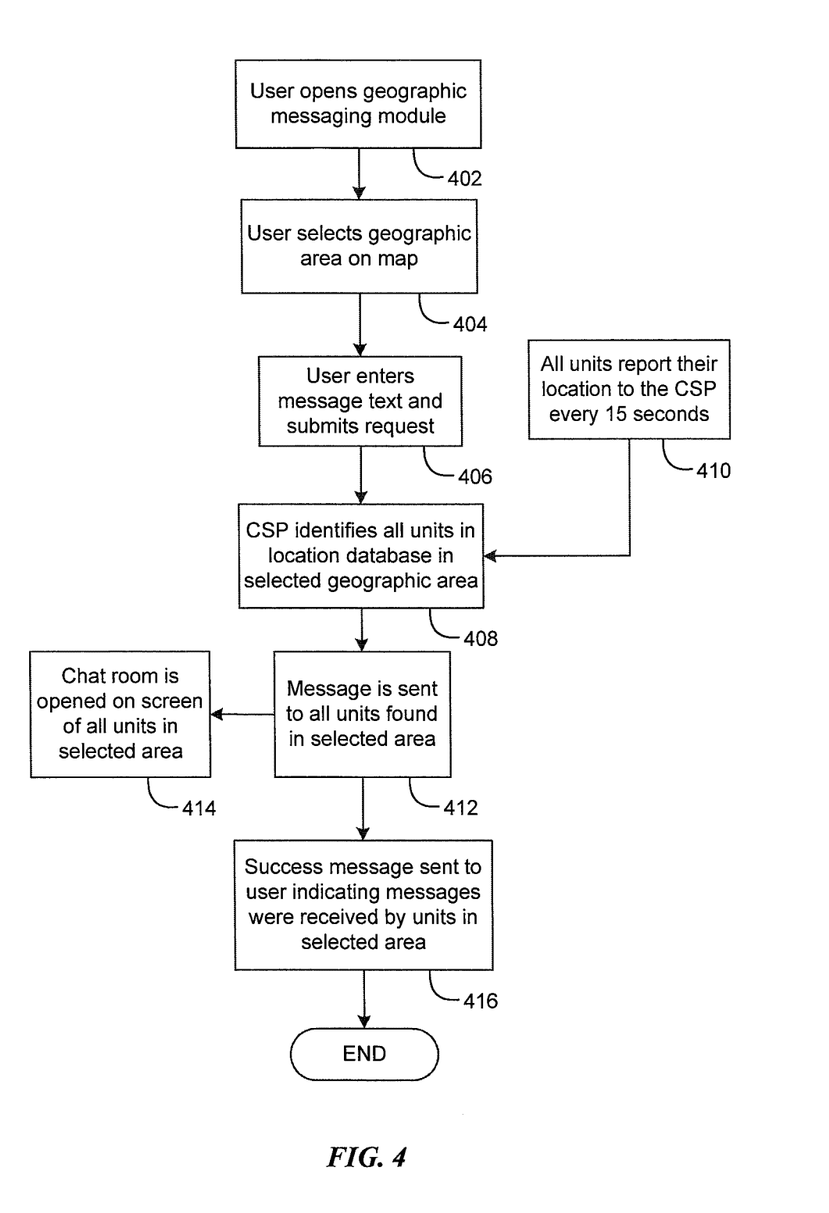
FIG. 4 is a flowchart of a second operation of the information handling system of FIG. 1.
Figure 8:
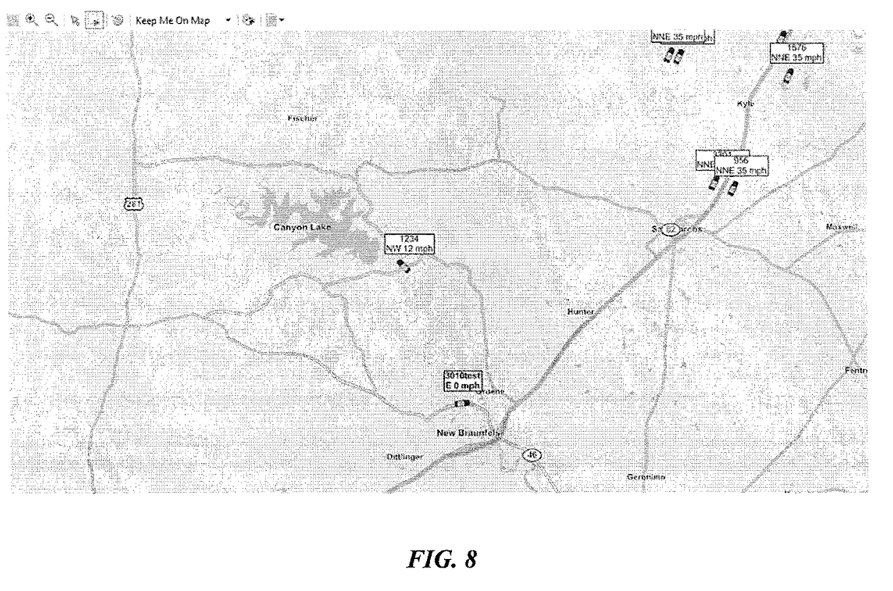
FIG. 8 is an illustration of a third screen displayed by a display device of the information handling system of FIG. 1.
Figure 9:
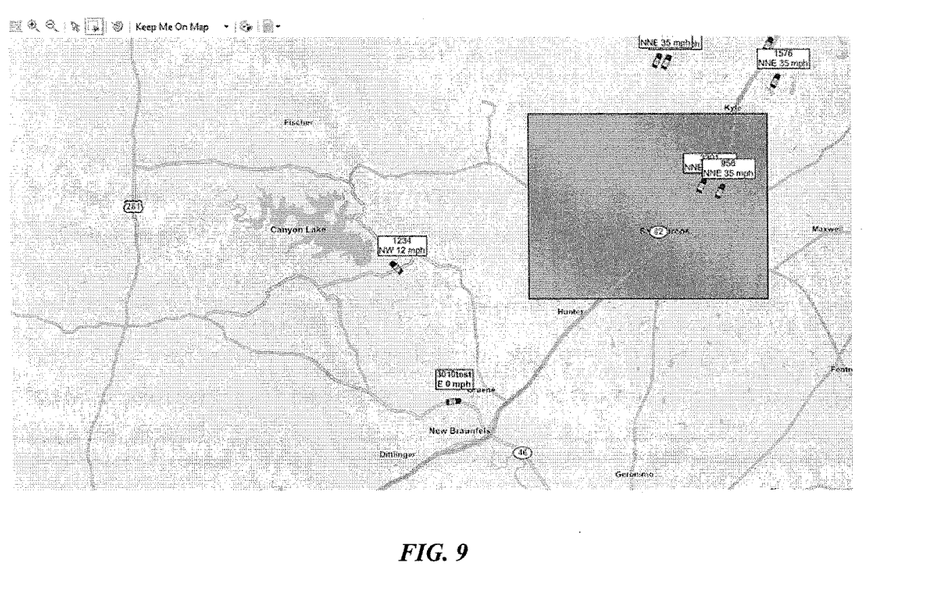
FIG. 9 is an illustration of a fourth screen displayed by a display device of the information handling system of FIG. 1.

FIG. 4 is a flowchart of a second operation of the system 100. At a step 402, in response to a patrol unit's receipt of a "geographic messaging" command from an officer via the patrol unit's associated input devices, the patrol unit automatically outputs (through its associated display device) an interactive map (e.g., as shown in FIG. 8) for display to the officer, so that the officer is enabled to specify a geographic area on the interactive map (e.g., by suitably operating a touch-screen display device, or by suitably operating the patrol unit's associated input devices). For example, the officer is enabled to specify the geographic area (step 404) as either: (a) an area within a geographic proximity (e.g., within a 5-mile geographic radius) of the patrol unit's then-current geographic location; or (b) any other area (e.g., even an irregularly shaped area), irrespective of whether the patrol unit is then-currently located within such area (e.g., as shown in FIG. 9).

At a step 406, from the patrol unit's associated input devices and/or display device, the patrol unit: (a) receives the officer's specified geographic area and the officer's specified communication (e.g., alphanumeric text); and (b) in response thereto, automatically outputs such information (e.g., the officer's specified geographic area and the officer's specified communication) within a "geographic communication" message to the CSP. At a step 408, in response to the "geographic communication" message, the CSP automatically: (a) receives and stores a record of the "geographic communication" message in association with such patrol unit's reported then-current geographic location; and (b) executes a software application for identifying all other patrol units that are then-currently located within the officer's specified geographic area (e.g., by analyzing the AVL information). As shown at a step 410, through the network 102, the patrol units report their respective then-current geographic locations to the CSP at a periodic rate (e.g., once every 15 seconds), as discussed hereinabove in connection with the step 320 (FIG. 3).

After the step 408, the CSP outputs (through the network 102) the officer's specified communication to only those other patrol units identified at the step 408. In response to those other patrol units' receipt of the officer's specified communication from the CSP, they output (through their respectively associated display devices) suitable information to their respectively associated officers, who may respond accordingly. For example, such information includes display of: (a) the officer's specified communication (step 412); and (b) a chat room screen (e.g., as shown in FIG. 6) for such officers to communicate (by alphanumeric text messages) with one another about possible responses (step 414). At a step 416, in response to those other patrol units' receipt of the officer's specified communication from the CSP, the CSP outputs (through the network 102) a success message for indicating such fact to the officer who issued the "geographic messaging" command.

Figure 5:
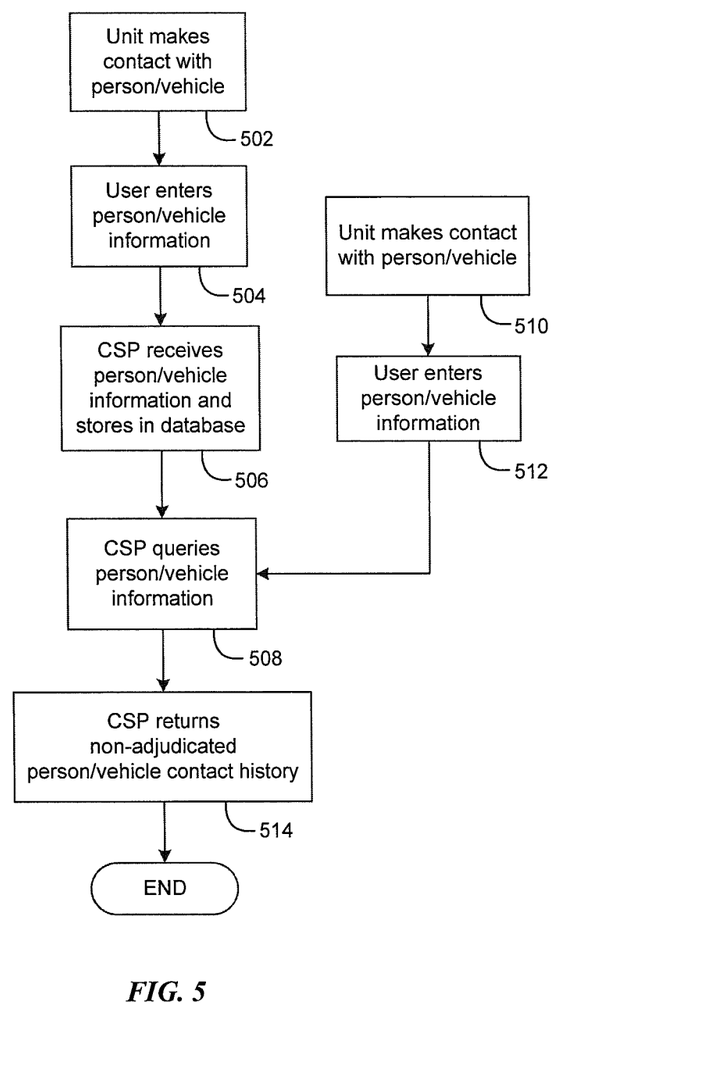
FIG. 5 is a flowchart of a third operation of the information handling system of FIG. 1.

FIG. 5 is a flowchart of a third operation of the system 100. At steps 502 and 504, in response to a patrol unit's receipt of a "contact history" record from an officer via the patrol unit's associated input devices, the patrol unit automatically outputs a "contact" message and such record to the CSP through the network 102. For example, the patrol unit receives the "contact history" record from the officer via the patrol unit's associated input devices, in response to the officer's: (a) communication with a person (e.g., pedestrian, occupant of a building, passenger of a motor vehicle, and/or operator of a motor vehicle); (b) visit to a location (e.g., physical address); and/or (c) encounter with an object (e.g., weapon, drugs, contraband, motor vehicle, and/or other property). At a step 506, in response to the "contact" message (which includes relevant subject identification data, such as vehicle identification data and/or person identification data), the CSP automatically receives and stores such record in the CSP's database (e.g., stored in the computer readable medium 212 of the CSP), irrespective of whether such record has been adjudicated (e.g., adjudicated by a court of law).

At a step 508, in response to the CSP's receipt (e.g., through the network 102) of a suitable query command from a human user (e.g., from among the CSP, agencies and patrol units), the CSP searches and analyzes its various databases of information (e.g., the sources 312 of FIG. 3) to identify relevant ones of such records. In one example, the suitable query command includes relevant subject identification data, such as vehicle identification data and/or person identification data (steps 510 and 512). After the step 508: (a) the CSP outputs (e.g., through the network 102) such identified records to the querying user at a step 514; and (b) from the CSP, the querying user receives and views such identified records for analysis.

The suitable query command includes hard and/or soft identifiers. For example: (a) hard identifiers identify a group of such records by specifying a particular person, location or object; and (b) soft identifiers identify a group of such records by specifying other types of attributes. The CSP automatically stores such records that it receives from all patrol units within the system 100, irrespective of whether such patrol units belong to a particular agency. On a substantially real-time basis after such receipt and storage by the CSP, and subsequently, the CSP makes such records available for such query by any agency or patrol unit within the system 100, irrespective of whether such records originated from patrol units that belong to a different agency within the system 100.

In yet another operation of the system 100, in response to a patrol unit's receipt of a "pursuit mode" command from an officer via the patrol unit's associated input devices, the patrol unit ("patrol unit in pursuit") automatically: (a) outputs a "pursuit" message to the CSP through the network 102; and (b) reports its then-current geographic location to the CSP at a higher rate (e.g., once every second instead of once every 15 seconds), until either a predetermined amount of time expires or the patrol unit receives an "end pursuit mode" command from the officer via the patrol unit's associated input devices. In response to the "pursuit" message, the CSP automatically receives and stores a record of the "pursuit" message in association with such patrol unit's reported then-current geographic location. Such record is stored in the CSP's database (e.g., stored in the computer readable medium 212 of the CSP).

In response to the CSP's receipt (e.g., through the network 102) of a suitable query command from a human user (e.g., from among the CSP, agencies and patrol units): (a) the CSP outputs (e.g., through the network 102) such "pursuit" record to the querying user; and (b) from the CSP, the querying user receives and views such "pursuit" record for analysis. The suitable query command includes hard and/or soft identifiers. On a substantially real-time basis after such receipt and storage by the CSP, and subsequently, the CSP makes such "pursuit" record available for such query by any agency or patrol unit within the system 100, irrespective of whether such "pursuit" record originated from a patrol unit that belongs to a different agency within the system 100.

In one example, the patrol unit receives the "pursuit mode" command from the officer via the patrol unit's associated input devices, in response to the officer's then-current encounter with a location of interest. For example, if the officer is driving a patrol car in pursuit of a suspect and then-currently views an object being thrown from the suspect's moving vehicle at a particular geographic location, then such particular geographic location becomes a location of interest. If the patrol unit timely receives the "pursuit mode" command from the officer via the patrol unit's associated input devices, in response to the officer's then-current encounter with such location of interest, then the CSP (in response to the "pursuit" message from the patrol unit) automatically receives and stores a record of the "pursuit" message in association with such patrol unit's reported then-current geographic location. On a substantially real-time basis after such receipt and storage by the CSP, and subsequently, the CSP makes such "pursuit" record available for query by any agency or patrol unit within the system 100, so that such location of interest is more readily identifiable.

As will be appreciated by one skilled in the art, aspects of the illustrative embodiments may be embodied as a system, method or computer program product. Accordingly, aspects of the illustrative embodiments may take the form of an entirely hardware embodiment, an entirely software embodiment (including, but not limited to, firmware, resident software, or microcode) or an embodiment combining software and hardware aspects that may all generally be referred to herein as a "circuit," "module" or "system." Furthermore, aspects of the illustrative embodiments may take the form of a computer program product embodied in one or more computer readable medium(s) having computer readable program code embodied thereon.

Any combination of one or more computer readable medium(s) may be used in the illustrative embodiment. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), an optical fiber, a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium (including, but not limited to, wireless, wireline, optical fiber cable, RF, or any suitable combination of the foregoing).

Computer program code for carrying out operations for aspects of the illustrative embodiments may be written in any combination of one or more programming languages, including an object oriented programming language such as Microsoft .NET Framework, C#, Java, Smalltalk, C++ or the like and conventional procedural programming languages, such as the "C" programming language, Python programming language, or similar programming languages. The program code may execute entirely on the user's computer, partly on the user's computer, as a stand-alone software package, partly on the user's computer, and partly on a remote computer or entirely on the remote computer or server. The remote computer may be connected to the user's computer through any type of network, including a local area network ("LAN") or a wide area network ("WAN"), or the connection may be made to an external computer (e.g., through the Internet using an Internet Service Provider).

Aspects of the illustrative embodiments are described with reference to flowchart illustrations and/or block diagrams of methods, apparatus (systems) and computer program products according to the illustrative embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions (which execute via the processor of the computer or other programmable data processing apparatus) are processable to cause performance of the functions/acts specified in the flowchart and/or block diagram block or blocks.

These computer program instructions may also be stored in a computer readable medium that can direct a computer, other programmable data processing apparatus, or other devices to operate in a particular manner, such that the instructions stored in the computer readable medium produce an article of manufacture, including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process, such that the instructions that execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to the illustrative embodiments. In this regard, each block in the flowchart or block diagrams may represent a module, segment, or portion of code, which includes one or more executable instructions for implementing the specified logical operation(s). In some alternative implementations, the operations noted in the block may occur out of the order noted in the Figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by either general purpose or special purpose hardware-based systems that perform the specified operations or acts, or combinations of general or special purpose hardware and computer instructions.

The terminology used herein is for the purpose of describing particular embodiments only and is not intended to be limiting of the inventions. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the inventions in the form disclosed. Many modifications and variations will be apparent to those of ordinary skill in the art without departing from the scope and spirit of the inventions. The embodiment was chosen and described in order to best explain the principles of the inventions and the practical application, and to enable others of ordinary skill in the art to understand the inventions for various embodiments with various modifications as are suited to the particular use contemplated.

What is claimed is:

1. A method comprising:
   receiving data periodically for identifying a location of a patrol unit;
   determining that the patrol unit is pursuing a subject, wherein the subject includes at least one of: a subject vehicle; or a subject person;
   increasing a rate associated with the periodic receipt of data for identifying a location of the patrol unit after determining the patrol unit is pursuing the subject;
   determining a contact with the subject vehicle or subject person at a time subsequent to the storing;
   decreasing the rate after a predetermined time or after the determined contact;
   receiving information from a human officer associated with the patrol unit about the contact; and
   storing for later retrieval information about the contact and one or more locations associated with pursuit or contact with the subject even when subject is not formally booked or charged with an offense.

2. The method of claim 1 wherein receiving the data and receiving the information occur via a wireless telecommunications network.

3. The method of claim 1 wherein increasing the rate includes increasing the periodic rate until a predetermined amount of time expires.

4. The method of claim 1 wherein increasing the rate includes increasing the periodic rate until a command is received from the human officer.

5. The method of claim 1 further comprising:
   after storing the information, making the information available for query.

6. The method of claim 5 wherein the patrol unit is a first patrol unit, and wherein the information is available for query by a second different patrol unit.

7. The method of claim 5 wherein the information is available for query in response to a query command that includes at least one of: a hard identifier; and a soft identifier.

8. An information handling system, comprising:
   a network connection for communicating information about at least one subject, wherein the subject includes at least one of: a subject vehicle; or a subject person;
   a database for storing the information;
   a computer coupled to the network connection that receives data periodically for identifying a location of a patrol unit, determines that the patrol unit is pursuing a subject, wherein the subject includes at least one of: a subject vehicle; or a subject person, increases a rate associated with the periodic receipt of data for identifying a location of the patrol unit after determining the patrol unit is pursuing the subject, determines a contact with the subject vehicle or subject person at a time subsequent to the storing, decreases the rate after a predetermined time or after the determined contact, receives information from a human officer associated with the patrol unit about the contact; and stores for later retrieval information about the contact and one or more locations associated with pursuit or contact with the subject even when the subject is not formally arrested, cited or charged with an offense.

9. One or more non-transitory computer readable storage media encoding instructions that, when executed by one or more computers, cause the one or more computers to perform operations comprising:
- receiving data periodically for identifying a location of a patrol unit;
- determining that the patrol unit is pursuing a subject, wherein the subject includes at least one of: a subject vehicle; or a subject person;
- increasing a rate associated with the periodic receipt of data for identifying a location of the patrol unit after determining the patrol unit is pursuing the subject;
- determining a contact with the subject vehicle or subject person at a time subsequent to the storing;
- decreasing the rate after a predetermined time or after the determined contact;
- receiving information from a human officer associated with the patrol unit about the contact; and
- storing for later retrieval information about the contact and one or more locations associated with pursuit or contact with the subject even when subject is not formally booked or charged with an offense.

10. The one or more non-transitory computer readable storage media of claim 9, wherein receiving the data and receiving the information occur via a wireless telecommunications network.

11. The one or more non-transitory computer readable storage media of claim 9, wherein increasing the rate includes increasing the periodic rate until a predetermined amount of time expires.

12. The one or more non-transitory computer readable storage media of claim 9, wherein increasing the rate includes increasing the periodic rate until a command is received from the human officer.

13. The one or more non-transitory computer readable storage media of claim 9, wherein the one or more computers are further configured to perform operations comprising:
- after storing the information, making the information available for query.

14. The one or more non-transitory computer readable storage media of claim 13, wherein the patrol unit is a first patrol unit, and wherein the information is available for query by a second different patrol unit.

15. The one or more non-transitory computer readable storage media of claim 13, wherein the information is available for query in response to a query command that includes at least one of: a hard identifier; and a soft identifier.

16. The information handling system of claim 8, wherein receiving the data and receiving the information occur using a wireless network.

17. The information handling system of claim 8, wherein increasing the rate includes increasing the periodic rate until a predetermined amount of time expires.

18. The information handling system of claim 8, wherein increasing the rate includes increasing the periodic rate until a command is received from the human officer.

19. The information handling system of claim 8, wherein the information is available for query in response to a query command that includes at least one of: a hard identifier; and a soft identifier.

* * * * *